March 30, 1965 C. F. FULLER ETAL 3,175,465
METHOD AND APPARATUS FOR MACHINING MANHOLE RIMS AND COVERS
Filed July 11, 1963 6 Sheets-Sheet 1

INVENTORS
CHARLES F. FULLER
EDWIN RUFF
BY
Lothrop & West
ATTORNEYS

March 30, 1965 C. F. FULLER ETAL 3,175,465
METHOD AND APPARATUS FOR MACHINING MANHOLE RIMS AND COVERS
Filed July 11, 1963 6 Sheets-Sheet 2

INVENTORS
CHARLES F. FULLER
EDWIN RUFF
BY
Lothrop & West
ATTORNEYS

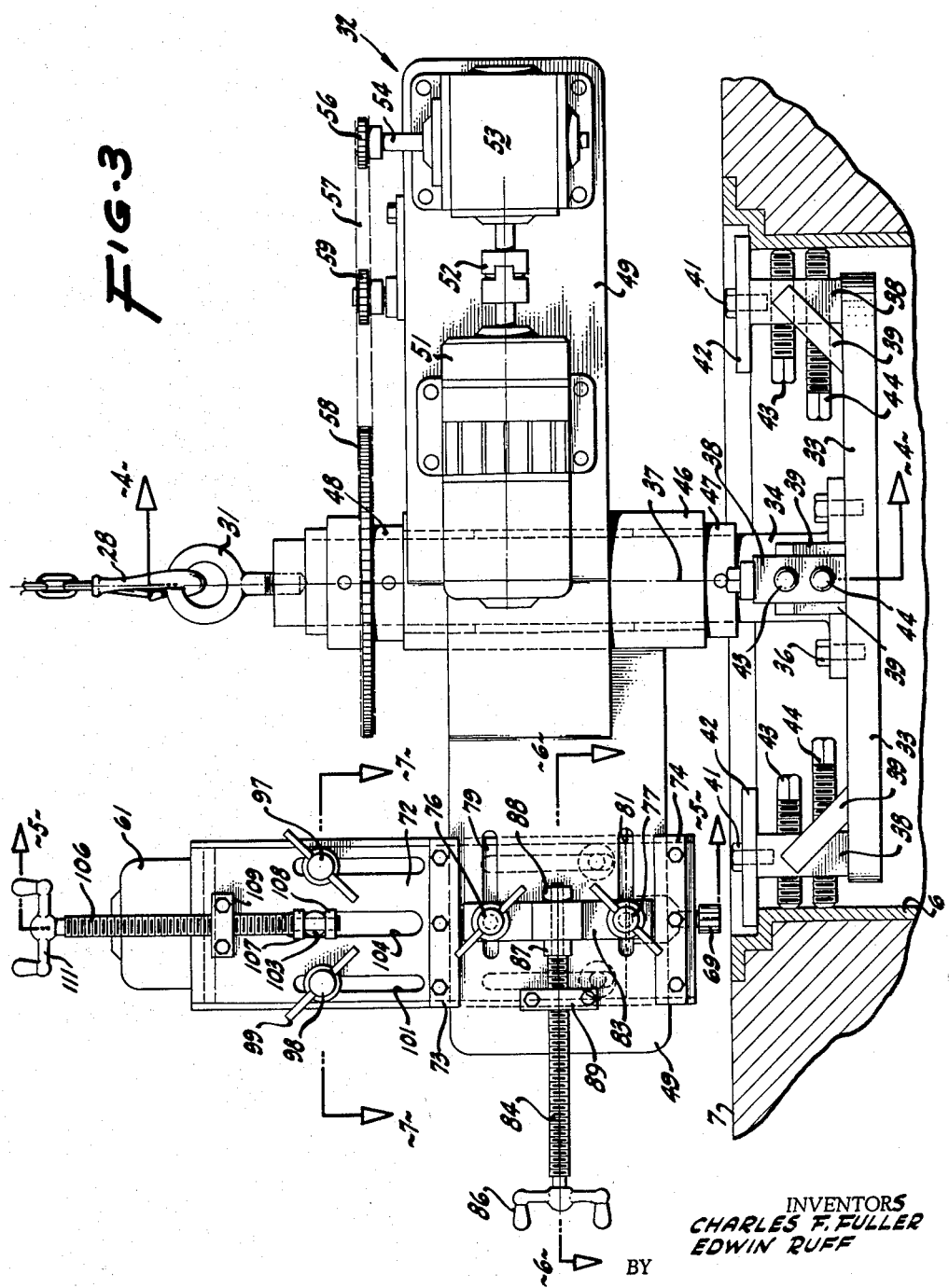

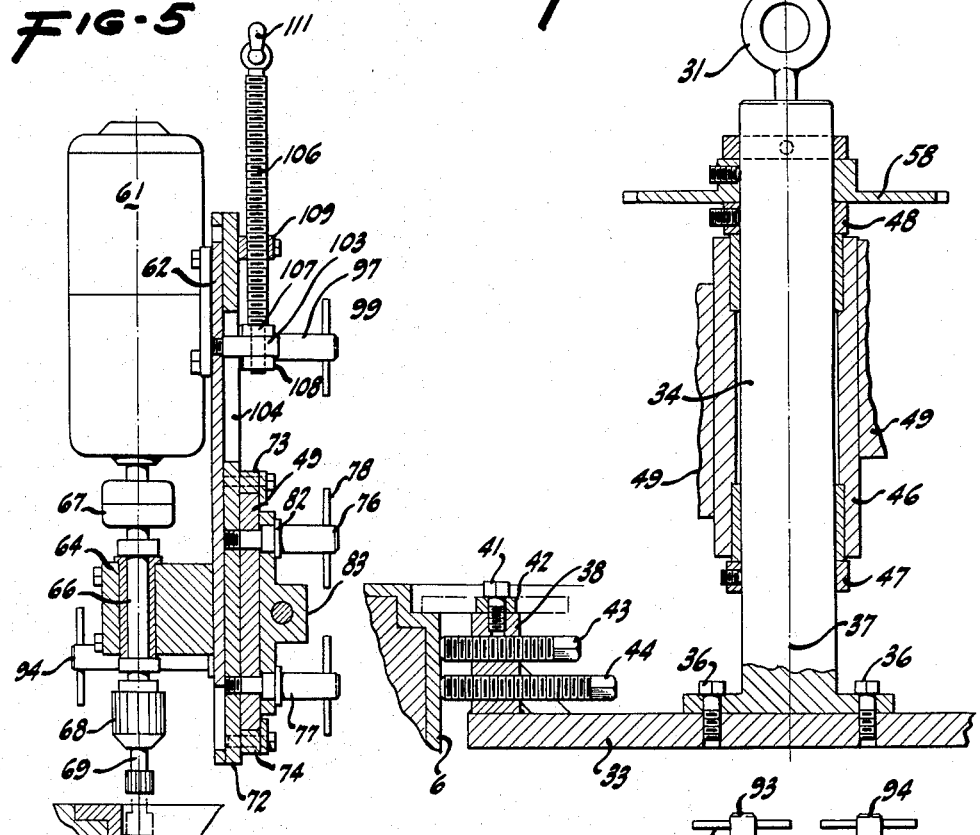

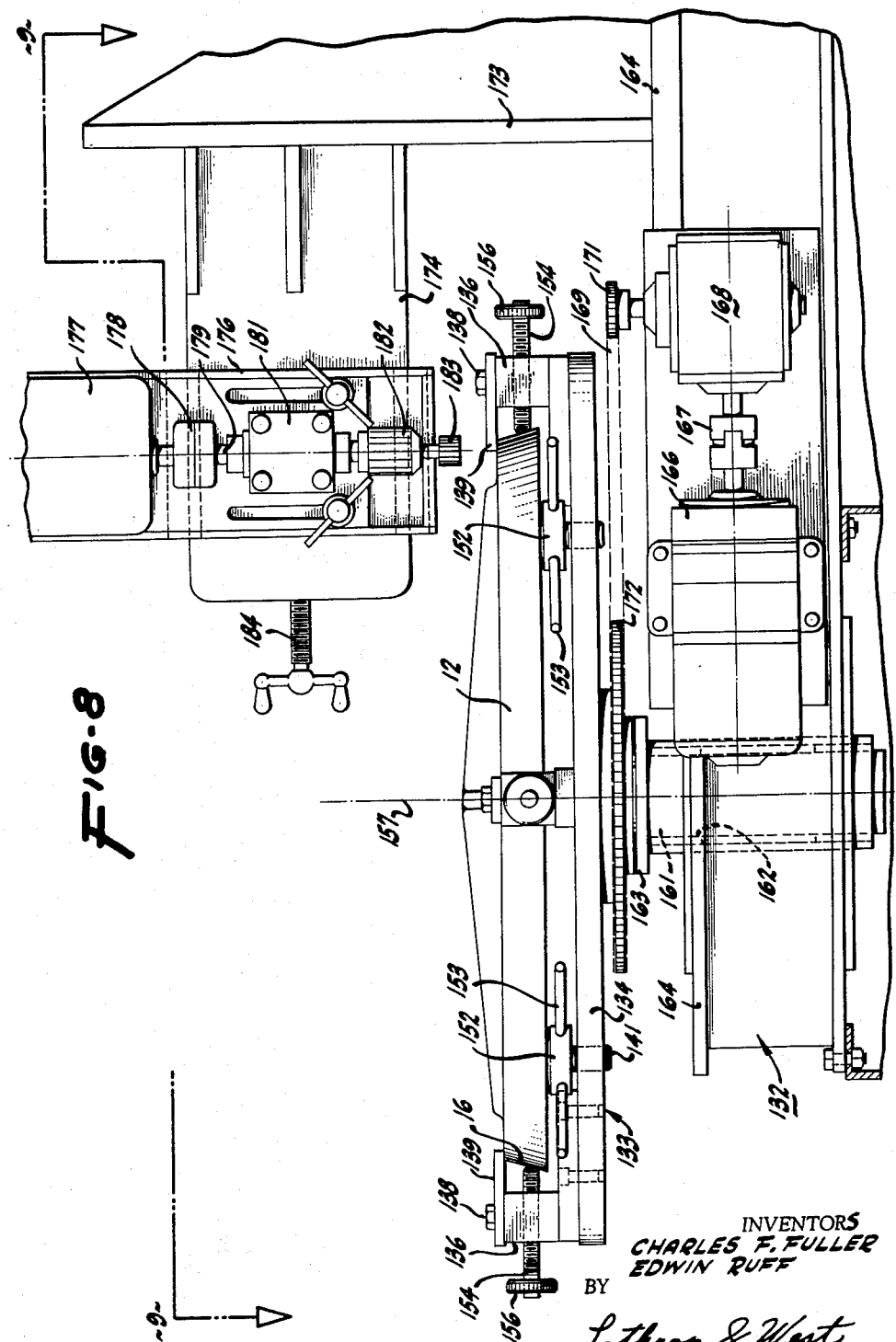

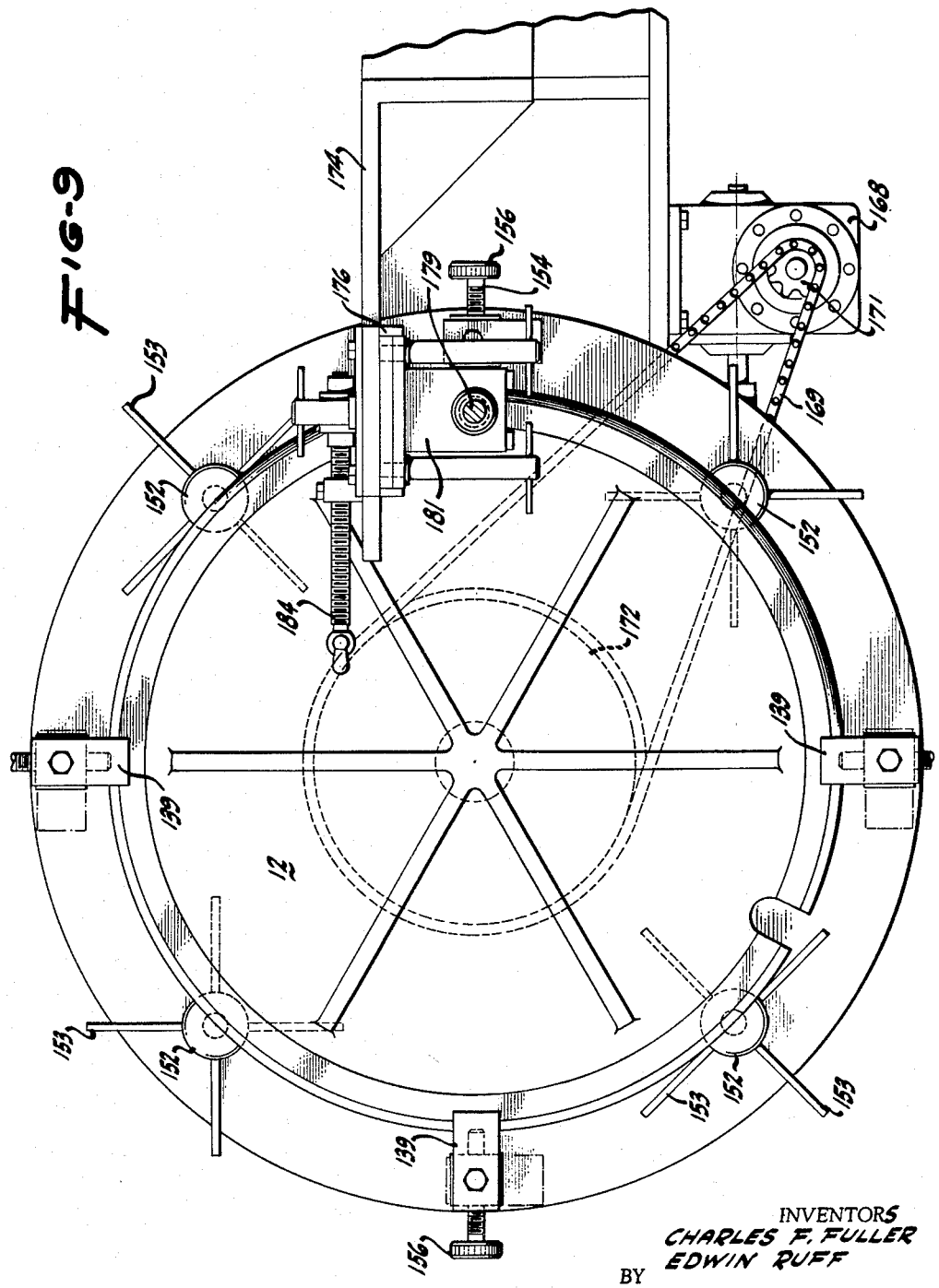

United States Patent Office 3,175,465
Patented Mar. 30, 1965

3,175,465
METHOD AND APPARATUS FOR MACHINING
MANHOLE RIMS AND COVERS
Charles F. Fuller, 2444 Arden Way, and Edwin Ruff,
410 Messina Drive, both of Sacramento, Calif.
Filed July 11, 1963, Ser. No. 294,328
11 Claims. (Cl. 90—12)

Our invention relates to portable machinery effective to machine in situ or near the site not only a manhole rim while it is still fixed in the pavement, but also to machine the mating manhole cover.

After initial installation or sometimes even upon initial installation, manhole covers do not fit the manhole rims with sufficient accuracy to avoid rocking motion, noise and eventual wear. It is a costly operation to remove a manhole cover, transport it to a central shop for machining, and then to return the machined cover for reinstallation at the site. Sometimes the machining operation is not sufficient when carried out only on the manhole cover because initial defects or previous wear have battered or misshapen the manhole rim. To remove the manhole rim, which is customarily a large and heavy casting, not only requires tearing up a portion of the surrounding roadway, but also may require removal of some of the usual brick or concrete emplacement. Despite the massiveness of the manhole cover and its supporting rim, there are changes in shape of the cover and sometimes of the rim from time to time so that there is a need for a better method and apparatus for initially installing the manhole cover with its cooperating rim and for refinishing the manhole cover and its rim when distortions have occurred.

It is therefore an object of the invention to provide a method and apparatus for machining a manhole cover and a manhole rim at the site.

Another object of the invention is to provide an apparatus which can readily be utilized at the site for quickly and accurately refinishing the manhole cover rim and also and often simultaneously remachining the manhole cover to fit the rim.

Another object of the invention is to provide a way of utilizing the rim and cover themselves as devices for cooperating with the machining mechanism to insure that an appropriate interfit of the parts is had after machining.

Another object of the invention is to provide machinery for refinishing manhole rims and manhole covers, the machinery being for the most part interchangeable from one use to the other.

Another object of the invention is to provide an improved method and apparatus for machining manhole rims and manhole covers.

Other objects together with the foregoing are attained in the embodiment of the invention described in the accompanying description and illustrated in the accompanying drawings, in which:

FIGURE 3 is a side elevation of the structure illustrated in FIGURE 2, the manhole and rim being shown in cross section on a vertical axial plane;

FIGURE 4 is a detail cross section, the plane of which is indicated by the line 4—4 of FIGURE 3;

FIGURE 5 is a detail cross section, the plane of which is indicated by the line 5—5 of FIGURE 3;

FIGURE 6 is a detailed cross section, the plane of which is indicated by the line 6—6 of FIGURE 3;

FIGURE 7 is a detail cross section, the plane of which is indicated by the line 7—7 of FIGURE 3;

FIGURE 8 is a side elevation with a few portions in section and other portions being broken away of the apparatus for machining a manhole cover;

FIGURE 9 is a cross section, the planes of which are indicated by the line 9—9 of FIGURE 8; and FIGURE 10 is a detail showing in cross section a machined manhole cover in position on a machined manhole rim.

Figure 1:
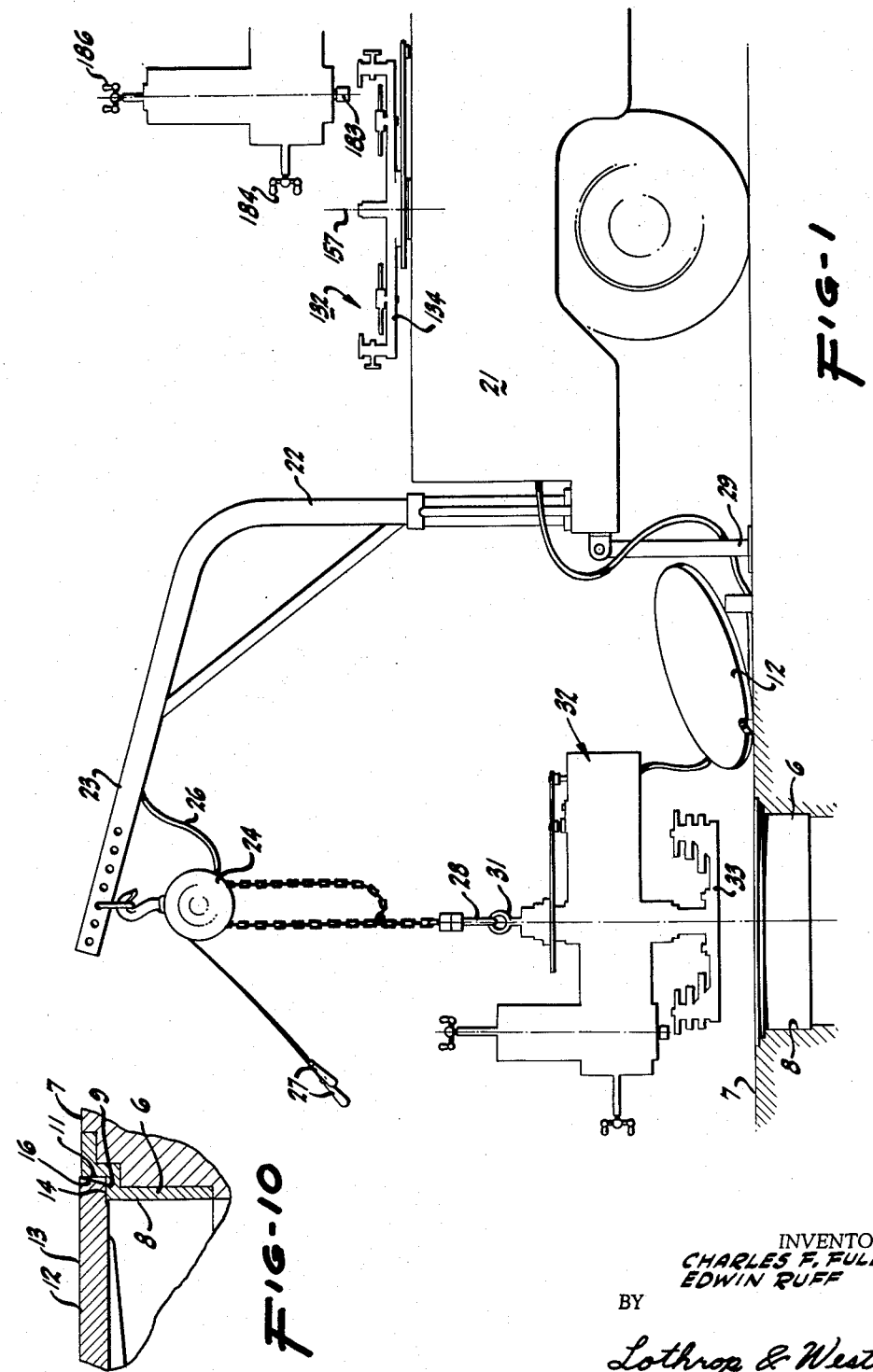
FIGURE 1 is a side elevation, partially schematic, and with certain portions broken away to illustrate the use of the manhole cover and rim machining apparatus in carrying out the process of our invention.

While the method can be practiced and the apparatus can be used under a variety of different circumstances, they are described herein in a typical instance as used in connection with a manhole rim 6 (FIGURE 10) which is normally buried flush with a street having a surface 7. The manhole rim is an annular work-piece usually in the form of a casting having a vertically extending circular-cylindrical surface 8 which merges with a horizontal surface 9. There are other bounding surfaces 11 in a generally vertical position to define the position of a manhole cover 12 which fits into the rim. The cover itself is usually a metal casting and has a top surface 13 intended to be substantially coplanar with the street surface 7. The cover 12 rests upon the horizontal surface 9 at an annular surface 14 which is preferably horizontal. A bounding edge 16 of the cover is referred to herein generally as a vertical surface to correspond with the nomenclature for the surfaces 8 and 11, but in practice the surface 16 is usually somewhat tapered, although it is close to a vertical orientation. It is to be especially noted that the terms "vertical" and "horizontal" herein are used with respect to an installation in which the street surface 7 itself is horizontal. It is recognized that under some installation conditions the manhole rim and the manhole cover are not precisely in horizontal orientation but the relative relationships of the parts remain the same.

Pursuant to our invention, a manhole rim 6 supporting a cover 12 is machined in situ by bringing equipment to the site. This is customarily done in a pickup truck 21 especially equipped with a rotatable crane 22 having a boom 23 from which a chain hoist 24 depends. Preferably the chain hoist is power operated by electricity supplied through a conductor 26 from a suitable source on the pickup truck and is under the control of an operator by switch handles 27. The chain hoist carries a hook 28 which can be utilized to remove the cover 12 from the manhole rim if necessary. In any event, the first operation upon arriving at the site is to remove the cover 12 from the rim 6 and to place the cover to one side. Preferably, because of the weights involved, the truck is provided with ground-engaging jacks 29, although in many instances these can be eliminated.

For the machining of the manhole rim itself, the chain hoist is arranged with the hook 28 engaging an eye-bolt 31 in a rim machining apparatus generally designated 32. This apparatus is customarily carried to the site in the rear of the pickup truck 21 and by appropriate manipulation of the boom 23 and the hoist 24 the mechanism is lifted from the back of the truck and is poised over the manhole rim. The switch control 27 is operated then to lower the apparatus 32 as nearly as possible in vertical or axial alignment with the rim.

The apparatus 32 includes a frame 33. In this instance, this is a circular metal plate carrying a central shaft 34 fastened by machine screws 36 to the frame plate 33 and extending vertically upward therefrom in symmetry with a vertical axis 37. Mounted on the frame plate 33 at appropriate intervals are posts 38 having lateral braces 39. The posts are all alike and are similarly equipped. At the top of a typical post 38 there is a machine screw 41 serving as a pivotal support for a rotatable stop 42.

Figure 2:
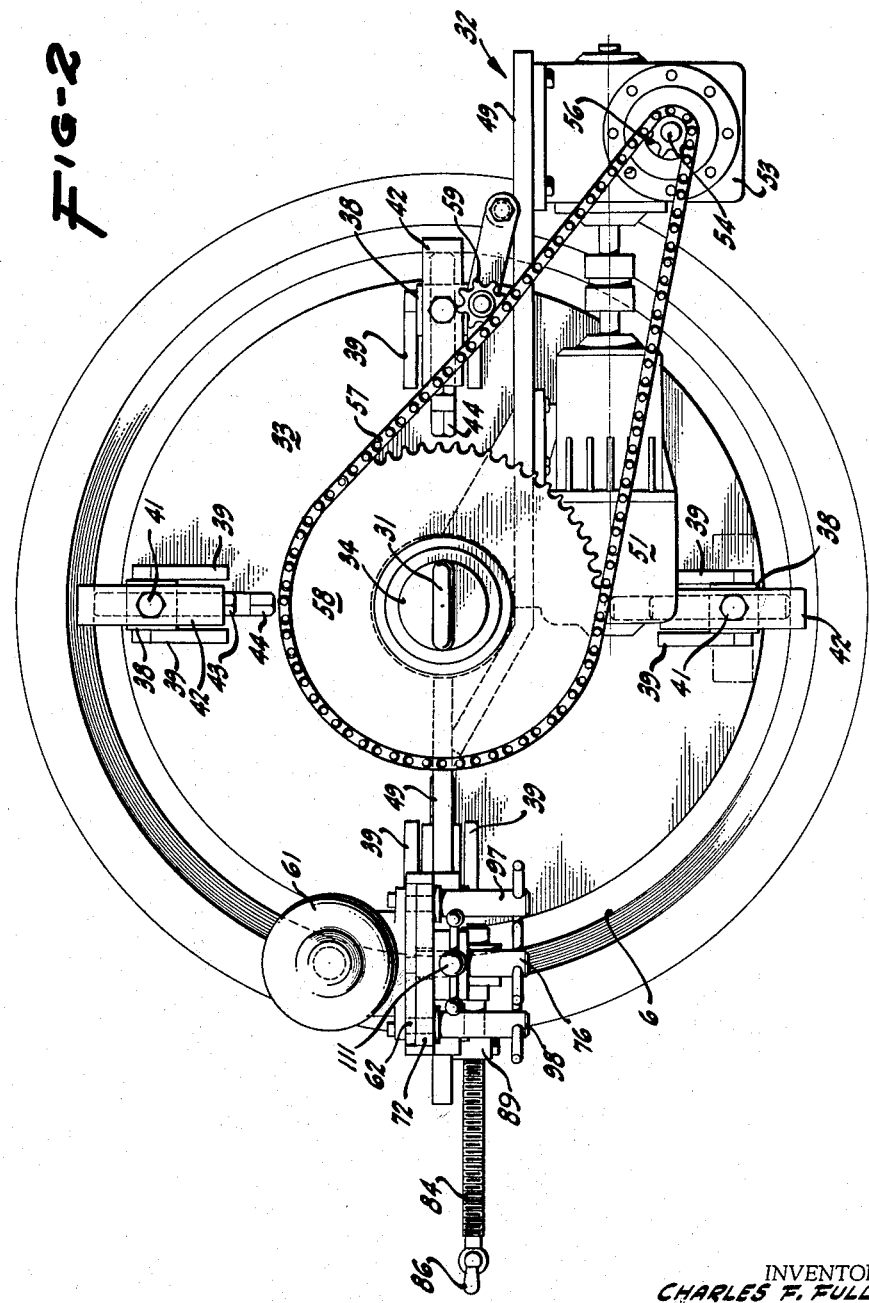
FIGURE 2 is a plan of the manhole rim machining apparatus in operating position on a manhole rim.

The stop is a two-armed member rotatable through ninety degrees between a first, radial position in which one end of the stop 42 overlies the horizontal surface 9 of the manhole rim and a second position (see FIGURE 2) in which the stop is away from the surface 9. Initially, as the apparatus 32 is lowered, the stops 42 are all in their radial positions and extend outwardly. If necessary, the machine screws 41 can be tightened to hold them firmly in this position. The lowering operation continues until such time as the entire weight of the apparatus 32 is transmitted through the stops 42 to the manhole rim. At that juncture the hook 28 can be disconnected if desired. And in any event, the chain hoist 24 is operated to afford slack, so that the entire weight of the apparatus 32 is borne by the manhole rim. This is thus a levelling operation to orient the apparatus to the same level as the surface 9.

Since the apparatus is not necessarily centered at this juncture, means are provided for affording a centering operation. Each of the posts 38 carries a pair of set screws 43 and 44 of different length so that they can be easily operated from above. The set screws 43, for example, can all be operated individually, that is to say, can be rotated about their individual horizontal axes, until such time as by measurement it is determined that the axis 37 is concentric with the circular-cylindrical vertical surface 8 of the rim. This centering operation does not impose a very large force on the rim and is merely sufficient to translate the apparatus 32 horizontally into the proper centralized location.

Following this, the adjusting set screws 43 can be further tightened and in addition the other set screws 44 are all tightened substantially so that they firmly engage the vertical surface 8. This is for the purpose of bearing the weight of the entire apparatus 32 on the vertical member of the rim. When this has been accomplished, the machine screws 41 are loosened slightly, if necessary, and the stops 42 are rotated ninety degrees into their retracted position so as to expose or free the entire horizontal surface 9. The apparatus is then ready for operation.

To perform the operation, there is provided on the shaft 34 a rotating sleeve 46 held in place by suitable thrust bearings 47 and 48 and itself carrying a radial arm 49. Mounted on the arm 49 in order to rotate it by power about the vertical axis 37 is an electric motor 51 supplied with power from a suitable source, usually on the truck 21. The motor is connected by a coupling 52 to a speed reducer 53. A vertical shaft 54 extending upwardly from the speed reducer carries a sprocket 56 engaged by a chain 57. A sprocket 58 fast on the shaft 34 is also engaged by the chain 57. A swinging idler 59 is effective to maintain the chain with appropriate tautness. When the motor 51 is energized, the chain drives the arm 49 around the axis 37 at a relatively slow rate.

Appropriate cutting apparatus is provided on the rotating arm 49. Counterbalancing the weight of the motor and speed reduction mechanism is a motor 61 preferably driven electrically from a power source on the truck 21 and mounted with its axis vertical and on a movable plate 62. Upstanding from the plate 62 is a mounting block 64 in which revolves a shaft 66 joined to the shaft of the motor 61 by a coupling 67. The shaft 66 at its lower end carries a standard chuck 68 in which a cutting tool such as an end mill 69 or an end milling cutter is situated.

Means are provided for moving the plate 62 relative to the arm 49 in both a horizontal sense and a vertical sense in order to vary the position of the cutter 69. Arranged alongside the arm 49 for horizontal translation is a supporting plate 72 to which are fastened guides 73 and 74 so that the plate 72 is slidable with respect to the arm 49. To produce this sliding movement, the member 72 is threaded to receive a pair of clamping bolts 76 and 77 having handles 78 thereon. The clamping bolts have cylindrical portions passing through elongated slots 79 and 81 in the arm 49 and also carry collars 82 which bear against a bridge 83. The bridge 83 is internally threaded and receives an adjusting screw 84 having an operating handle 86 at one end thereof and having collars 87 and 88 clamping the screw in the bridge 83 and against translation. The screw 84 is also threadedly engaged with a block 89 fast on the arm 49. When the members 76 and 77 are slightly loosened and the handle 86 is rotated, the bridge 83 translates the members 76 and 77 in the slots 79 and 81 and simultaneously moves the plate 72 horizontally.

For vertical movement, the plate 62 operates between vertical guides 91 and 92 on the sides of the plate 72 and is provided with a lower pair of clamping bolts 93 and 94 having handles 96 thereon and an upper pair of clamping bolts 97 and 98, each with a handle 99 thereon. All of the clamping bolts extend through appropriate slots 101 in the plate 72. Also projecting from the plate 62 is a bridge 103 extending through a slot 104 in the plate 72. Rotatable in the bridge 103 is a screw shaft 106 held against axial translation by collars 107 and 108. The screw 106 threadedly engages a block 109 projecting from and fastened to the plate 72. When a handle 111 at the upper end of the screw 106 is rotated, the screw is advanced or retracted with respect to the block 109 and the bridge 103 is correspondingly moved vertically. This carries the plate 62 with it and also raises and lowers the cutting tool 69 with its driving motor 61. By these means there are provided vertical and horizontal movements of the cutting tool 69 so that it can be positioned as desired with respect to the surface 9 of the manhole rim.

In the operation of this structure, once the device has been lowered, centered, gripped and the surface 9 has been exposed, the motor 51 is energized, as is the motor 61. The handles 111 and 86 are manually controlled to position the milling cutter 69 to rotate once or if necessary a number of times on the surface 9 to afford a proper refinishing thereof to leave that surface in a horizontal plane normal to the axis 37 and appropriately finished for the receipt of a refinished manhole cover. While it is not usually necessary, the milling cutter 69 can also be operated to machine the surface 11 of the rim.

Following the operation of this structure, the tool 69 is well retracted, the motors 61 and 51 are stopped, the stops 42 are released and rotated into their radial positions and are lightly clamped, the set screws 43 and 44 are backed off, and the hoist 24 is again utilized to lift the apparatus 32 from the manhole rim, leaving it free for the reception of the manhole cover.

Under most circumstances, it is entirely feasible during the time that the rim is being machined also to machine the removed cover.

For this purpose, conveniently disposed in the pickup truck 21 is an apparatus 132 effective to machine the surface 14 of the cover 12. The cover is removed from its position, as shown in FIGURE 1, by means of the hoist 24 and is located in inverted position in a turntable frame 133. This frame includes a circular disk 134 having a plurality of upright posts 136 thereon. Each of the posts carries a machine screw 138 serving as a pivot and clamp for a stop 139 movable between a radial position and a retracted position.

Also mounted on the frame disk 134 is a plurality, usually four, of jack screws 141, all of which are alike so that a description of one applies to the others as well. The jack screw 141 has an enlarged abutting head 152 and a plurality of operating arms 153, so that upon rotation of the screw 141 the head 152 is raised and lowered.

When the inverted manhole cover 12 is first lowered toward the disk 134 by the power winch 24, the stops 139 are retracted and out of the way. The cover 12 is lowered as nearly centrally and horizontally as may be and rests temporarily upon the heads 152. The stops 139 are then rotated into a radial position and are lightly clamped by tightening the machine screws 138. Then all of the jack screws 141 are appropriately operated to lift the manhole cover 12 in its inverted position until such time as it comes lightly into abutment with the underside of the stops 139. Following this, the manhole cover is centralized. Each of the posts 136 carries a set screw 154 having an operating handle 156. The various handles 156 are all operated in an appropriate direction to engage with the surface 16 of the manhole cover and thus shift the manhole cover horizontally until such time as by measurement it is found to be appropriately centered on a vertical axis 157. The set screws 154 after performing the centering operation are turned equally and very tightly to have a further fastening or gripping function so that the manhole cover is prevented from rotation with respect to the posts 136. Following this, the stops 139 are swung out of the way.

Means are provided for rotating the frame 134 about the axis 157. The frame for that reason carries a shaft 161 mounted in a journal 162 and resting on a thrust block 163. The bearing and thrust block are both mounted in an arm 164 suitably carried on the truck 21. To afford rotation of the frame 134, the arm 164 carries an electric motor 166 preferably supplied with power from a suitable source on the truck 21 and is connected by a shaft coupling 167 to a speed reducer 168. A chain 169 engages a sprocket 171 turned by the speed reducer 168 and also engages a sprocket 172 fast on the shaft 161. Thus when the motor 166 is energized, the frame 134 is rotated at a slow rate relative to the arm 164.

Pursuant to the invention, means are provided for holding a cutting tool for operation on the manhole cover as it is revolving. For this reason, the arm 164 has an upright 173 and an extension bracket 174 overlying the frame 134.

On the bracket 174 is a tool frame 176 quite comparable to the tool frame or plate 62. The tool frame 176 carries an electric motor 177 joined by a coupling 178 to a shaft 179 journalled in a box 181 and carrying a chuck 182. A milling cutter 183 such as an end mill is mounted in the chuck 182. The frame 176 is provided with a horizontal adjustment 184 precisely like that previously described in connection with the milling cutter 69 and is also provided with a vertical adjustment partly broken away in FIGURE 8 but just as illustrated in FIGURE 5, the parts being clamped in position and moved as previously indicated.

With this arrangement, when the motor 166 has been energized and the motor 177 is energized, the horizontal adjuster 184 and the vertical adjuster 186 (FIGURE 1) are manipulated to bring the cutting tool 183 into operating relationship with the upwardly exposed, annular surface 14 of the manhole cover. The adjusters 184 and 186 are operated to provide the desired finished surface on the cover. When that has been attained, the motors 177 and 166 are de-energized, the tool 183 is moved away from the work, the handles 156 are backed off, and the cover 12 is removed and is reinstalled with the rim. The machining operation has therefore been accomplished on both the cover and the rim.

Since many of the parts of the apparatus 32 are the same as those of the apparatus 132, it is not necessary to provide two complete mechanisms, but rather the parts of one can be shifted to the other. For example, the motor 61 and its cutter 69 can be removed as a unit from the environment shown in FIGURE 5 and can be installed in the relationship shown in FIGURE 8. Likewise, many of the driving and rotating mechanisms are identical and can be interchanged or can be used successively in either of the two locations.

There has thus been provided pursuant to the invention not only an apparatus which is effective to machine a manhole rim and a manhole cover in situ and adjacent the site, but also there has been afforded a method of providing a machined surface on a manhole rim and on a manhole cover in a simpler and more direct and much more economical fashion than heretofore.

What is claimed is:

1. An apparatus for machining a manhole rim comprising a frame having a plurality of posts upstanding therefrom, stops mounted on said posts for rotation about vertical axes into and out of engagement with a horizontal surface of said rim, set screws mounted in said posts for rotation about horizontal axes into and out of engagement with a vertical surface of said rim, a central shaft upstanding from said frame on a first vertical axis, an arm mounted on said shaft for rotation about said first vertical axis, means interconnecting said arm and said shaft for rotating said arm about said first vertical axis, a milling cutter, a motor connected to drive said milling cutter, and means for mounting said milling cutter and said motor on said arm for rotation about a second vertical axis.

2. An apparatus as in claim 1 in which said means for mounting said milling cutter and said motor is movable on said arm both vertically and horizontally.

3. An apparatus for machining a manhole cover comprising a frame, a turntable, means for mounting said turntable on said frame for rotation about a vertical axis, a plurality of posts upstanding from said turntable, stops mounted on said posts for rotation about vertical axes into and out of positions overlying a manhole cover on said turntable, a plurality of jack screws mounted in said turntable for rotation about vertical axes to lift and lower said manhole cover toward and away from said stops, set screws mounted in said posts for rotation about horizontal axes into and out of engagement with an edge of said manhole cover, a cutting tool, and means on said frame for supporting said cutting tool over said turntable in a position to engage a manhole cover on said turntable.

4. An apparatus as in claim 3 in which said cutting tool is a milling cutter and said supporting means carries a motor connected to drive said milling cutter.

5. An apparatus as in claim 4 in which said cutting tool and said motor are movable toward and away from said manhole cover in a vertical direction and in a horizontal direction.

6. An apparatus for machining a circular work-piece having a horizontal surface and a vertical surface comprising a frame, stops mounted on said frame for horizontal movement between a first position overlying said horizontal surface and a second position away therefrom, set screws mounted on said frame for horizontal movement into and out of engagement with said vertical surface, a central shaft extending from said frame on a vertical axis, an arm engaging said shaft for relative rotation therebetween, a motor on said arm, means for interconnecting said motor and said frame for providing relative angular movement between said arm and said frame, a cutting tool, and means for said arm for mounting said cutting tool for movement toward and away from said work-piece in both a vertical direction and a horizontal direction.

7. An apparatus as in claim 6 in which said frame has a plurality of jack screws for urging said work-piece toward said stops.

8. An apparatus as in claim 6 in which the weight of said apparatus is borne by said stops.

9. A method of machining a manhole rim in situ comprising lowering a frame containing machining apparatus until said frame is supported on a horizontal surface of said rim, then shifting said frame horizontally until said frame is centered with respect to a vertical cylindrical surface of said rim, then supporting said frame by engagement with said vertical surface, then discontinuing the support of said frame on said horizontal surface, and then operating said machining apparatus to machine said horizontal surface.

10. A method of machining a circular work-piece having a horizontal surface and a vertical cylindrical surface comprising engaging a frame containing machining apparatus vertically against said horizontal surface, then shifting said frame horizontally relative to said work-piece until said frame is centered relative to said vertical cylindrical surface of said work-piece, then engaging said frame and said work-piece on said vertical cylindrical surface against vertical relative movement therebetween, then disengaging said frame and said horizontal surface, and then operating said machining apparatus to machine said horizontal surface.

11. An apparatus for machining a manhole rim comprising a frame, first means on said frame for supporting said frame on a top surface of said rim, second means on said frame for supporting and centering said frame on a side surface of said rim, a central shaft on and upstanding from said frame, an arm rotatable on said shaft, means for rotating said arm on said shaft, a cutting tool, and means for mounting said cutting tool on said arm for vertical and radial movement relative thereto, said first supporting means being mounted on said frame for movement horizontally into and out of engagement with said top surface.

References Cited by the Examiner
UNITED STATES PATENTS

| | | | |
|---|---|---|---|
| 259,727 | 6/82 | Smith | 90—12 |
| 1,625,800 | 4/27 | Edwards | 82—4 |
| 1,747,944 | 2/30 | Lyne | 82—4 |
| 1,832,923 | 11/31 | Turner | 82—4 |
| 2,211,134 | 8/40 | Kruell | 82—4 |
| 2,553,570 | 5/51 | Flynn | 82—4 |

WILLIAM W. DYER, JR., *Primary Examiner.*